Feb. 28, 1950   R. J. BRANDT   2,499,294
FILTER FRAME WITH HINGED CLIPS THEREFOR
Filed April 12, 1947
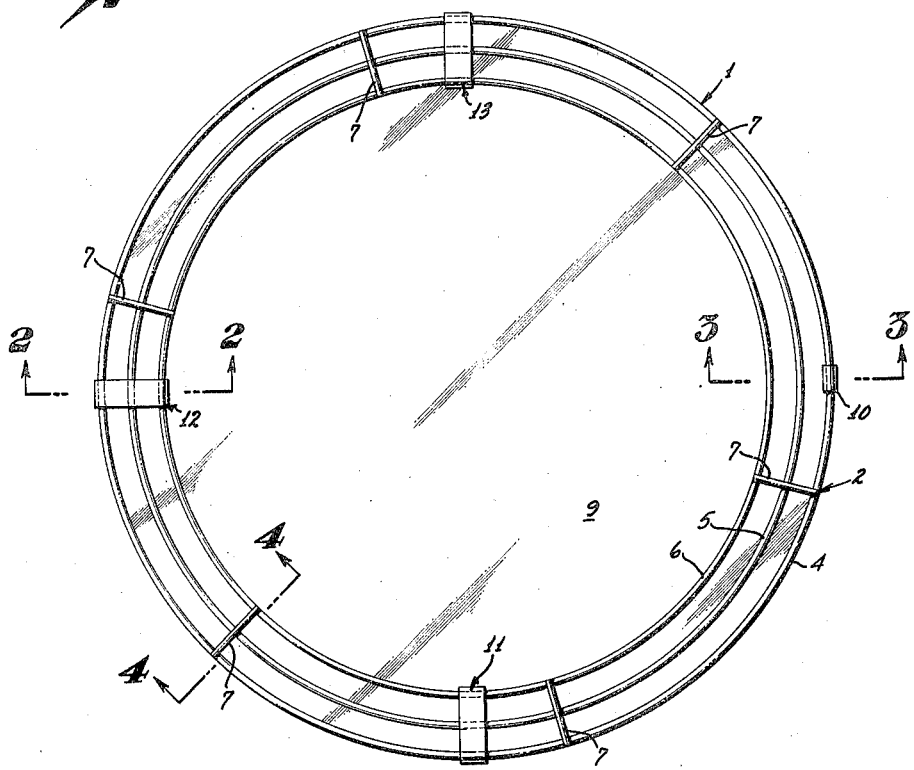
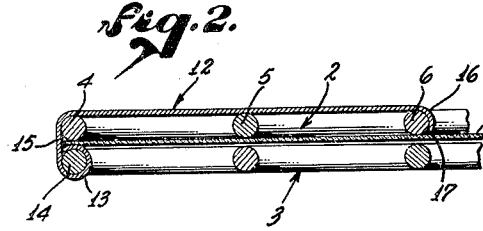
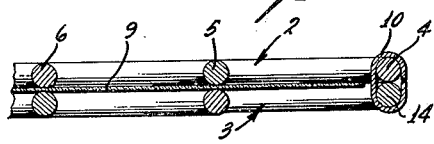
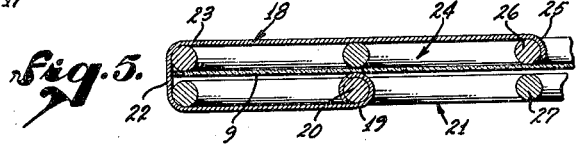
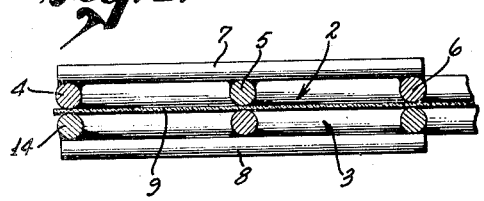
INVENTOR:
ROBERT J. BRANDT.
BY
ATTORNEY.

Patented Feb. 28, 1950

2,499,294

UNITED STATES PATENT OFFICE 2,499,294

FILTER FRAME WITH HINGED CLIPS THEREFOR

Robert J. Brandt, Hollywood, Calif.

Application April 12, 1947, Serial No. 741,059

3 Claims. (Cl. 88—113)

The invention relates to a filter frame and more particularly to a frame for frictionally gripping a filter employed for photographic purposes. The friction grip permits the filter to expand when it becomes heated by a projection lamp, without tearing the filter, as more fully explained in my U. S. Patent 2,401,044, patented May 28, 1946, for "Filter frame."

In the prior patent, the frames are held together by separate spring clips and the present invention has for an object to improve the patented construction in two respects. In the patent, the spring clips are separate members which are employed to hold the two frame members together and when these items are taken apart there results a large number of loose parts which are not mechanically connected together, whereby some of the parts may be misplaced. Also, the clips in the patent are of a construction requiring the rings of the two frame members to be overlapped to facilitate insertion and removal of the spring clips. Both of these disadvantages are overcome by the present invention which has for an object to provide a filter frame with clips, not necessarily clips of spring material, all connected together in one unitary structure, and to avoid the necessity for overlapping the corresponding rings of the frame members when inserting or removing the clips.

For further details of the invention, reference may be made to the drawings wherein Fig. 1 is a plan view of a filter frame according to the present invention.

Figs. 2, 3 and 4 are enlarged sectional views on lines of the corresponding numbers in Fig. 1 looking in the direction of the arrows.

Fig. 5 is a view corresponding to Fig. 2 showing a modified form of clip.

Referring in detail to the drawings, the filter frame 1 comprises two frame members 2 and 3 each like the frame members of the patent, and each frame member is like its companion. As disclosed in the patent, frame member 2 comprises three coaxial coplanar rings 4, 5 and 6 interlocked by a number of spaced cross pieces such as 7 and 8 which are welded or otherwise secured thereto. The frame member 3 has three similar rings and the corresponding rings of each member 2 and 3 are of the same diameter whereby the corresponding rings of the members are opposite each other and are adapted to frictionally grip the filter 9 which may be the usual "gel" as described in the patent.

According to the present invention, the frame members 2 and 3 are connected together by a hinge 10 which permits the frame members to be opened up or closed together for insertion or removal of the filter 9. Also, the invention provides one or more clips, three being indicated at 11, 12 and 13. The clips 11, 12, 13 and hinge 10 are equally spaced around the frame member to grip the filter 9 between the frame members 2 and 3 at equal spaced intervals. All three of the clips 11, 12 and 13 are alike and the one indicated at 12 is shown in Fig. 2 and this clip at one end has a hinge connection 13 with the outer ring 14 of frame member 3, an intermediate portion or short arm 15 which embraces the outer edges of both frame members 2 and 3 to urge them together and at right angles thereto a long arm terminating in an inner end portion 16 bent over and serving as a catch to engage the inner ring 6 of the frame member 2. The length of the clip portion 15 is such that the outer rings 4 and 14 will frictionally grip the filter 9 between them, while the end portion 16 is at the end of a long lever arm to facilitate operating the clip.

The rings of the frame members 2 and 3 are of metal and the inner ring 6 has enough flexibility in its own plane so that the catch 16 and the similar catches on the other clips can be engaged with or disengaged from the inner ring 6. The ease with which ring 6 can be flexed in its own plane decreases as the cross piece such as indicated at 8 is approched and each clip is preferably located adjacent to a cross piece where the spring action of the ring is strong so the ring 6 will firmly spring against the catches like 16. The end of the catches like 16 terminates short of the filter 9 as indicated at 17 to avoid cutting the filter when it expands under action of heat from the projection lamp.

In the modification shown in Fig. 5, the clip 18 has a hinge 19 on the middle wire 20 of the frame member 21. The clip 18 is otherwise the same as clip 12 in Fig. 2, namely, with an intermediate or short arm portion 22 which embraces both frame members and an outer portion or long arm 23 which extends over the three wires of the upper frame member 24, terminating at its inner end in a catch 25 to engage the innermost ring 26 of the frame member 24.

The clips, such as 12 and 18, need not be made of spring steel but can be made of body steel to withstand wear on the hinge and catch, the rings being flexible enough in their own plane to permit the clips like 12 and 18 to be latched and unlatched from the frame members. Use has also been made of clips having a hinge on the innermost ring indicated at 27 in Fig. 5, but this requires that the clip be of spring steel and is not preferred, a sufficient grip on the filter 9 being obtained with the clips in either Fig. 2 or Fig. 5.

Various modifications may be made without departing from the spirit of the following claims.

I claim:

1. A filter frame comprising a pair of frame members each comprising interconnected coaxial and coplanar inner and outer rings, clips constructed and arranged to embrace the edge of said frame members, each of said clips having a short arm portion having a hinge connection with an outer ring of one of said members and having at right angles thereto a long arm terminating in a catch engageable with an inner ring of the other of said members, and a hinge connection between the outer rings of said members.

2. A filter frame comprising a pair of similar frame members each comprising three interconnected coaxial and coplanar inner and outer rings, the rings of one of said members being of substantially the same diameter as the corresponding rings of the other member, a hinge between said frame members, means comprising clips each having a comparatively short clamping portion fitting edgewise across the outermost rings of said pair and terminating at its inner end in a hinge on an outer ring of one of said members for clamping a filter between corresponding rings of said members, each of said clips having a comparatively long outer portion fitting across the three rings of the other frame member, said outer portion terminating in a catch engageable with the innermost ring of said other frame member.

3. A filter frame comprising a pair of frame members each comprising interconnected coaxial and coplanar inner and outer rings, a hinge between said frame members, a clip having at one end thereof a hinge on an outer ring of one of said members, said clip having a comparatively short intermediate portion for embracing and clamping the edges of said frame members and having a longer portion having at the other end thereof a catch engageable with an inner ring of the other of said members, said ring which is engageable with said catch having flexibility in the plane of said ring permitting engagement and disengagement of said catch.

ROBERT J. BRANDT.

REFERENCES CITED

The following references are of record in the file of this patent:

UNITED STATES PATENTS

| Number | Name | Date |
|---|---|---|
| 1,213,653 | Jolly et al. | Jan. 23, 1917 |
| 1,242,808 | Hutton | Oct. 9, 1917 |
| 1,608,348 | Timberlake | Nov. 23, 1926 |
| 1,829,867 | Koster | Nov. 3, 1931 |
| 2,323,072 | Murata | June 29, 1943 |
| 2,389,089 | Schwartz | Nov. 13, 1945 |
| 2,401,044 | Brandt | May 28, 1946 |